Patented July 24, 1923.

1,462,881

UNITED STATES PATENT OFFICE.

THOMAS M. CHANCE, OF PHILADELPHIA, PENNSYLVANIA.

METHOD FOR PRODUCING FLUID-SEPARATING MEDIUMS AND FLUID-SEPARATING MEDIUM PRODUCED THEREBY.

No Drawing.     Application filed January 25, 1922. Serial No. 531,770.

*To all whom it may concern:*

Be it known that I, THOMAS M. CHANCE, a citizen of the United States, residing at Philadelphia, in the county of Philadelphia and State of Pennsylvania, have invented a certain new and useful Method for Producing Fluid-Separating Mediums and Fluid-Separating Medium Produced Thereby, whereof the following is a specification.

My invention relates to a method of producing fluid separating mediums, composed of mixtures of liquid and solid components substantially insoluble therein, for use in the washing of coal, the concentration of ores and like uses. Said mediums may be either fluid masses of the type described in U. S. Patents Nos. 1,224,338, 1,392,399, and 1,392,400, issued to me and No. 1,392,401 issued to myself and Henry M. Chance as co-inventors, or natural suspensions of finely divided solids in liquid, or mixtures of such fluid masses and such suspensions.

Separating mediums of the desired type may be utilized as fluids of specific gravity higher than that of the liquid component thereof, this characteristic being employed either for direct flotation of the lighter constituents of the materials to be separated or for opposing greater resistance to fall of said materials than that opposed by the liquid component alone.

As described in Patent 1,224,338, this increase in density is due to the presence of the included solid component and to produce a required density of the medium, in the art as heretofore practiced, it is necessary to employ a predetermined interstitial liquid volume between the particles of the solid component if the specific gravity of said solid is predetermined. Conversely, if the desired interstitial liquid volume is fixed, then for any required predetermined density of the medium the specific gravity of the solid component is likewise fixed. It thus may be necessary to employ a solid component that is inherently expensive, as for instance when densities exceeding those readily obtainable with quartz fines are required and heavier material, such as comminuted pyrite or magnetite, must be used. On the other hand, a density may be required that is so low that with the lightest solid component that may be used, wide separation of the solid particles, and hence large interstitial liquid volumes, must be employed, resulting, in those type of media comprising fluid masses, in the use of intensive agitation to maintain such interstitial volumes. These conditions are due to the fact that finely divided materials available for use as the solid component of these types of separating media are of markedly different unit specific gravities. Thus, between comminuted anthracite coal at say 1.46 specific gravity, quartz at 2.6, chalcopyrite at 4.1, magnetite at 5.0, galena at 7.5, and native copper at 8.8, there are such abrupt and great changes in density that wide changes in the interstitial liquid volume must be made if the type of solid used be changed. If, however, it were possible to employ solids of graded specific gravity such great changes need not be necessary and in addition a reduction in the quantity of solid of high economic value required for media of high density could be effected. It is the object of my invention to provide a method whereby comminuted solid components of such graded specific gravity will be available for practical use in the production of more efficient and economic fluid separating mediums.

My present invention therefore consists in an improvement in the method of producing such fluid mediums, whether fluid masses, natural suspensions, or combinations of the two, that will permit of the preparation of separating media of not only the required density but also with interstitial liquid volumes that may be the most advantageous together with solid constituents of a nature that may be most desirable.

To attain these ends I employ what I term a "composite separating medium" composed of a plurality of comminuted insoluble solids of at least two different unit specific gravities, suspended in a liquid medium and so intimately intermixed that unit volumes of said separating medium will possess densities proportional to the relative specific gravities and volumetric percentages of the plural solids and liquid contained therein.

It will be clear to any skilled in the art that the production of a stable medium of this type must be premised either on the use of plural solids opposing like resistance to fall in the liquid component, or on the provision of agitating means that will maintain intermixture of the separating medium as outlined in the preceding paragraph. Thus, if some of the comminuted solids of low density is of less falling velocity in the liquid than all of that of high density, this low density solid may, if uniform upward current agitation is employed, produce a superposed fluid mass of lower specific gravity, a simple classification of such light material occurring such as is commonly accomplished in upward current classifiers. On the other hand, if the agitation be accompanied by intermixing of the plural solids, as in agitation by circulation of the fluid mass, or by mechanical or fluid mixing devices, such light material of minimum falling velocity will remain continuously incorporated as a portion of the plural solids and a stable fluid mass will be formed that will meet the above definition of a "composite separating medium."

To produce such a composite separating medium I intermix the necessary plural comminuted solids of different unit specific gravities with the liquid component of said medium, said plural solids being in such volumetric proportion to each other and to said liquid as to produce both the desired specific gravity and the desired interstitial liquid volume.

The carrying out of the method may be widely varied by any skilled in the art. Thus, the required composite separating medium may be produced by the mixing of simple fluid mediums previously prepared, each of said mediums containing one of the comminuted solids to be used in the composite medium; or, one or more of said solids may be added to a simple fluid medium composed of the other of said solids and the liquid; or, the plural solids may be mixed in the desired proportions before mixing with the liquid; etc.

The comminuted solids if sufficiently fine, may form natural suspensions which will remain continuously incorporated throughout the liquid component, otherwise they will eventually settle and agitation will be necessary for renewing or maintaining the fluidic properties of the medium. Solids of the latter class will form what I have termed fluid masses and will require the application of energy in the form of agitation to maintain their fluidic property. The application of this energy may be periodic or continuous. If periodic, then such application must be renewed before the work stored kinetically and potentially in the liquid and solid components,—i. e. the agitation,—is exhausted, if the fluidic properties of the composite separating medium are to be maintained, unless the solid components are to be allowed to settle into a partially fluidic, dense mass between agitating periods. Agitation, if employed, may be of any desired type; it may be applied in that portion of the composite medium in which separation of the materials fed into said medium is to be effected; it may be carried on in mixing receptacles, pumps and the like, at locations relatively remote from said portion; maintained circulation of the composite medium, or a portion thereof, may be employed; or, falling of the separated material of higher falling velocity through said medium may in certain cases suffice. As before pointed out, if some of the solids of low density are of lower falling velocity in the liquid component than all of the solids of high density, the agitating means should provide for thorough intermixing to prevent classification of such light, slow falling material from the body of the composite separating medium. The solid components may be composed of any desired materials that are substantially insoluble in the liquid and that will provide the proper density of the composite medium together with the desired interstitial liquid volumes. The sizes of their particles will depend on the amount, if any, of agitation that it is desired to use and also upon the relative size of the materials that are to be separated by immersion in said medium. The liquid component may consist of water or other fluid of the desired properties.

It will be evident that with two variables to be satisfied, a number of combinations of the necessary components is possible. Thus, if a composite separating medium with an interstitial liquid volume of 60% and a density of 2.0 be desired, solids of unit density of 2.5 and 5.0 are available and the liquid be water with a density of 1.0, then $.60 \times 1.0 + .24 \times 2.5 + .16 \times 5.0 = 2.00$ sp. gr., and we have 24% of light and 16% of heavy solids by volume. If, on the other hand, a simple fluid mass of density of 2.00 be made with the heavy constituent alone then it would be necessary to increase the interstitial liquid volume from 60% to 75%, thus $.75 \times 1.0 + .25 \times 5.0 = 2.00$ sp. gr. When employing the method in this way the lighter solid component is introduced as a diluent to permit the density to be obtained with a minimum of liquid component. Such a dilution by the addition of light solids is useful in the washing of bituminous coal for coking, when it may be desirable to employ densities of the separating mediums as low as 1.32, requiring, if silica sand and water be used, volumetric percentages of about 80% water and 20% sand, thus, $.80 \times 1.0 + .20 \times 2.6 = 1.32$ sp. gr. If my present invention be employed for the purpose and a composite separating medium be made with silica sand of 2.6 density, comminuted anthracite coal of 1.46 density and water of 1.0 density, then the interstitial volume can be reduced from 80% to 60% (or less) thus .60×1.0+.28×1.46+.12×2.6=1.3208 sp. gr.

If it be attempted to produce a simple fluid mass with anthracite coal of density 1.46 as the solid constituent, the maximum density obtainable would be less than 1.30, hence an additional solid component of higher density is necessary.

Another application of my invention lies in the increase in density of the separating medium attainable with a relatively cheap comminuted solid such as quartz sand by the addition of a more valuable heavy constituent, as for example magnetic iron ore sand. Thus, if 50% be the minimum allowable interstitial liquid volume, the maximum density with a mixture of quartz sand of 2.6 sp. gr. and water would be about 1.8 sp. gr., thus .50×1.0+.50×2.6=1.8 sp. gr. If now 1/5 of the quartz sand be replaced by magnetic sand then with 50% liquid volume the density would approximate 2.04 sp. gr. thus, .50×1.0+.40×2.6+.10×5.0=2.04. If magnetic sand alone were used to obtain this lighter density the relative volumetric proportions would be about 74% of water and 26% of magnetic sand, thus .74×1.0+.26×5.0=2.04 sp. gr.

It will be evident that my invention advantageously may be used, (1) to decrease both the percentage of comminuted solids of high specific gravity and the interstitial liquid volume, by the addition of comminuted solids of lower specific gravity, thus providing separating media of the required density more cheaply and efficiently; or, (2) to increase the attainable density of the separating medium when the interstitial liquid volume and the density of the most readily attainable comminuted solids are fixed, by the addition of a more valuable comminuted solid of higher density.

It will, therefore, be understood that by the use of composite separating fluid mediums of the described types I avoid the necessity for using larger liquid components than it may be convenient to use, and I also avoid the necessity for using liquid components so small as to reduce the fluidity and mobility of the separating medium by undesirably reducing the interstitial spaces between the particles of its solid constituents.

It is evident that by using suitable proportions of solids of different specific gravities, without varying the quantity of liquid contained in the mixture, that a composite fluid medium can be produced which will have almost any desired specific gravity, (up to that of the maximum attainable by such mixtures), thus making it possible to produce a medium having an almost exact approximation to that which may be required for the separation, by flotation or otherwise, of any materials of different specific gravities or of different rates of fall in such medium; and it is further evident that the specific gravity of such composite separating medium may be further adjusted to meet varying conditions of practice, by increasing or decreasing the proportion of its liquid constituent, thus reducing or increasing its density.

It will be understood that when in this specification and the claims hereof certain volumetric proportions of the plural solids and of the liquid are prescribed to be mixed to form composite separating mediums, this prescription may be carried out by computing the required quantities by the weights of their respective volumes, and that the quantities used may, if desired, be measured or weighed. The result thus obtained may be checked by hydrometric, or other, measurement of the specific gravity of the separating medium, and inaccuracies or errors may be corrected and the required specific gravity obtained by the addition of liquid or of one or more of the solids until such measurement shows the required specific gravity. Such errors or inaccuracies may be due to incorrect determination of the specific gravity of one or more of the plural solids, or to small bubbles or films of air or gas adhering to the individual particle of the comminuted solids.

Having described my invention, I claim,

1. The method for producing composite separating mediums for use in the separation of materials of unlike physical properties which consists in suspending in a liquid a plurality of intermixed comminuted solids substantially insoluble therein and of different specific gravities and in so proportioning the volumetric percentages of said solids and of said liquid as to attain the desired specific gravity of said medium.

2. The method for producing composite separating mediums for use in the separation of materials of unlike physical properties which consists in suspending in a liquid a pluralty of intermixed comminuted solids substantially insoluble therein and of different specific gravities, in so proportioning the volumetric percentages of said solids and of said liquid as to attain the desired specific gravity of said medium and in maintaining said suspended solids of higher specific gravity intermixed with those of lower specific gravity whereby said desired specific gravity may be maintained.

3. The method for producing composite separating mediums which consists in providing a liquid, and a plurality of comminuted solids of different specific gravities, said solids being of greater specific gravities than said liquid and substantially insoluble therein, in so proportioning the volumetric percentages of said liquid and of said solids that the average specific gravity of said liquid and said solids will be equal to that desired in the composite separating medium and in admixing the said liquid and the said solids.

4. The method for producing composite separating mediums which consists in providing a liquid, and a plurality of comminuted solids of different specific gravities, said solids being of greater specific gravities than said liquid and substantially insoluble therein, in so proportioning the volumetric percentages of said liquid and of said solids that the average specific gravity of said liquid and said solids will be equal to that desired in the composite separating medium and in maintaining said admixture to permit the continued use of the medium for separating materials of unlike physical characteristics.

5. The method for producing composite separating mediums of definite specific gravity composed of an intermixture of liquid and a plurality of comminuted solids subtantially insoluble in said liquid, said solids being of greater specific gravities than said liquid and of different specific gravities, which consists in controlling the specific gravity of said separating medium by varying the relative volumetric percentages of said plural solids and of said liquid and in intermixing said liquid and said solids.

6. A composite separting medium consisting of a mixture of a liquid and a plurality of comminuted solids substantially insoluble in said liquid, said solids having greater specific gravities than said liquid and being of different specific gravities the relative volumes of said solids and said liquid being so controlled as to produce a separating medium of the desired physical characteristics.

In testimony whereof I have hereunto signed my name at Philadelphia, Pennsylvania, this 24th day of January, 1922.

THOMAS M. CHANCE.

Witnesses:
GEORGE MARR,
H. M. CHANCE.